US 7,939,952 B2

(12) United States Patent
Borghi

(10) Patent No.: US 7,939,952 B2
(45) Date of Patent: May 10, 2011

(54) AUTOMOTIVE AUXILIARY POWER SYSTEM

(75) Inventor: Gianni Borghi, Albinea (IT)

(73) Assignee: Lombardini S.r.L., Reggio Emilia (IT)

( * ) Notice: Subject to any disclaimer, the term of this patent is extended or adjusted under 35 U.S.C. 154(b) by 660 days.

(21) Appl. No.: 11/884,550

(22) PCT Filed: Feb. 17, 2005

(86) PCT No.: PCT/IT2005/000085
§ 371 (c)(1),
(2), (4) Date: May 19, 2008

(87) PCT Pub. No.: WO2006/087739
PCT Pub. Date: Aug. 24, 2006

(65) Prior Publication Data
US 2008/0290844 A1 Nov. 27, 2008

(51) Int. Cl.
F02B 63/04 (2006.01)
(52) U.S. Cl. ........................................................ 290/1 A
(58) Field of Classification Search .................. 290/1 A, 290/1 B, 2; 165/42, 43, 44, 202; 62/236; 123/41.06
See application file for complete search history.

(56) References Cited

U.S. PATENT DOCUMENTS

| 3,841,108 | A | * | 10/1974 | Pierrat | 62/236 |
| 3,844,130 | A | * | 10/1974 | Wahnish | 62/133 |
| 4,531,379 | A | * | 7/1985 | Diefenthaler, Jr. | 62/236 |
| 4,756,359 | A | * | 7/1988 | Greer | 165/43 |
| 4,762,170 | A | * | 8/1988 | Nijjar et al. | 165/43 |
| 4,825,663 | A | * | 5/1989 | Nijjar et al. | 62/236 |
| RE33,687 | E | * | 9/1991 | Greer | 165/43 |
| 5,127,576 | A | * | 7/1992 | Weatherhead et al. | 237/2 A |
| 5,177,978 | A | * | 1/1993 | Brown | 62/236 |
| 5,296,799 | A | * | 3/1994 | Davis | 322/35 |
| 5,332,927 | A | * | 7/1994 | Paul et al. | 307/66 |
| 6,530,426 | B1 | * | 3/2003 | Kishita et al. | 165/202 |
| 6,796,367 | B2 | * | 9/2004 | Blacquiere et al. | 165/41 |
| 6,932,148 | B1 | * | 8/2005 | Brummett et al. | 165/43 |
| 7,150,159 | B1 | * | 12/2006 | Brummett et al. | 62/236 |
| 7,259,469 | B2 | * | 8/2007 | Brummett et al. | 290/40 C |
| 2002/0056993 | A1 | * | 5/2002 | Kennedy | 290/1 A |
| 2004/0000161 | A1 | * | 1/2004 | Khelifa et al. | 62/324.1 |
| 2004/0169374 | A1 | * | 9/2004 | Wurtele et al. | 290/1 A |

FOREIGN PATENT DOCUMENTS

| DE | 198 31 787 | 1/1999 |
| DE | 199 53 940 | 5/2000 |
| EP | 1 505 709 | 2/2005 |
| WO | WO 03/064202 | 8/2003 |

* cited by examiner

Primary Examiner — Julio Gonzalez
(74) Attorney, Agent, or Firm — Banner & Witcoff, Ltd.

(57) ABSTRACT

An auxiliary power system for a vehicle, having an auxiliary internal combustion engine with a starter is described. An auxiliary alternator driven by the auxiliary engine and connected to a battery of the vehicle and a control unit, which is connected to the battery, and activates the starter of the auxiliary engine in the event the voltage of the battery is below a reference value, may be included.

7 Claims, 2 Drawing Sheets

AUTOMOTIVE AUXILIARY POWER SYSTEM

This application is a national stage application of co-pending PCT application PCT/IT2005/000085 filed Feb. 17, 2005. The disclosure of this application is expressly incorporated herein by reference.

TECHNICAL FIELD

The present invention relates to an automotive auxiliary power system.

The invention is preferably, though not exclusively, applied to an auxiliary air conditioning system of the interior compartment of an industrial vehicle, in particular a truck, to which the following description refers purely by way of example.

BACKGROUND ART

As is known, motor vehicles, and particularly trucks, are equipped with an air conditioning system, hereinafter referred to as the "main" air conditioning system, comprising a compressor, a condenser, an expansion valve, and an evaporator, which together define in known manner a main cooling circuit in which a cooling fluid flows. The compressor is driven by the vehicle engine, which must therefore be kept running for the compressor to operate when the vehicle is stationary. In addition to inefficient use of the engine, this obviously also results in increased fuel consumption and pollutant emissions.

By way of a solution to the problem, an auxiliary air conditioning system has been proposed comprising an auxiliary heat engine of lower power than the vehicle engine; and an auxiliary cooling circuit, in turn comprising an auxiliary compressor, condenser, expansion valve and evaporator. When the vehicle is stationary, the auxiliary engine need therefore simply be kept running. Besides consuming less fuel than the main vehicle engine, the auxiliary engine can also be run in maximum-efficiency conditions, thus minimizing consumption and pollutant emissions.

U.S. Pat. No. 5,528,901 describes an auxiliary air conditioning system of the type briefly described above, and which also comprises an auxiliary alternator driven by the auxiliary engine and connected to the vehicle battery to charge it while the auxiliary air conditioning system is running.

Though useful, the alternator battery charge function is only performed when the auxiliary air conditioning system is running, whereas modern trucks are equipped with high-consumption electric user devices which must be kept operative even when the vehicle is stationary and regardless of whether or not the air conditioning system is running. Typical examples of such devices are satellite security devices, which draw current when the vehicle is parked and the air conditioning system may be turned off.

DISCLOSURE OF INVENTION

It is an object of the present invention to provide an automotive auxiliary power system, designed to provide a solution to the above problems.

According to the present invention, there is provided an auxiliary power system for a vehicle, comprising an auxiliary internal combustion engine having a starter; a current generator driven by said auxiliary engine and connectable to a battery of the vehicle; and control means; characterized in that said control means comprise comparing means connected to said battery to determine the voltage of the battery; and further control means for activating said starter of said auxiliary engine; said control means generating an enabling signal to activate said starter of said auxiliary engine in response to a voltage value of said battery below a reference value.

According to an essential characteristic of the invention, therefore, the auxiliary engine can be started automatically upon detection of a low battery charge condition. The system therefore also provides for automatically charging the battery, so that relatively high-consumption electric user devices, such as satellite security devices, can be operated even for prolonged periods and in the absence of the driver.

In a preferred embodiment of the invention, the power system comprises an auxiliary cooling circuit for air conditioning the interior compartment of the vehicle, and the compressor of which is driven by the auxiliary engine.

According to a further preferred characteristic of the invention, the auxiliary cooling circuit is fully independent of the cooling circuit of the main air conditioning system of the vehicle, so that the auxiliary power system can be installed with no alterations required to existing on-vehicle systems.

The present invention also relates to a method of automatically charging a battery of a vehicle by means of an auxiliary power system comprising an auxiliary internal combustion engine, and an auxiliary current generator driven by said auxiliary engine; characterized by comprising the steps of:
 a) acquiring the voltage of said battery;
 b) comparing the acquired voltage value with a reference value;
 c) commencing a charge cycle to charge the battery by automatically starting said auxiliary engine in the event the acquired voltage value is below the reference value.

In a preferred embodiment of the invention, the method comprises the further steps of turning the auxiliary engine off after a predetermined charge time, and again acquiring the voltage of the battery.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
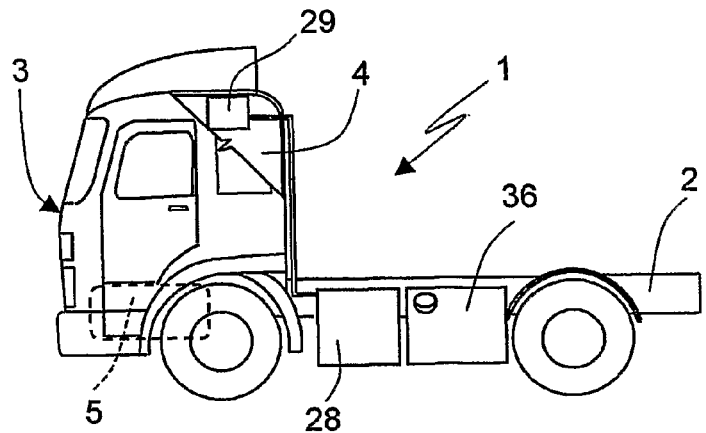
FIG. 1 shows a schematic side view of a truck equipped with an auxiliary power system in accordance with the present invention.

Number 1 in FIG. 1 indicates as a whole a truck comprising a frame 2; and a cab 3 supported on frame 2 and having a rear bunk compartment 4.

Figure 2:
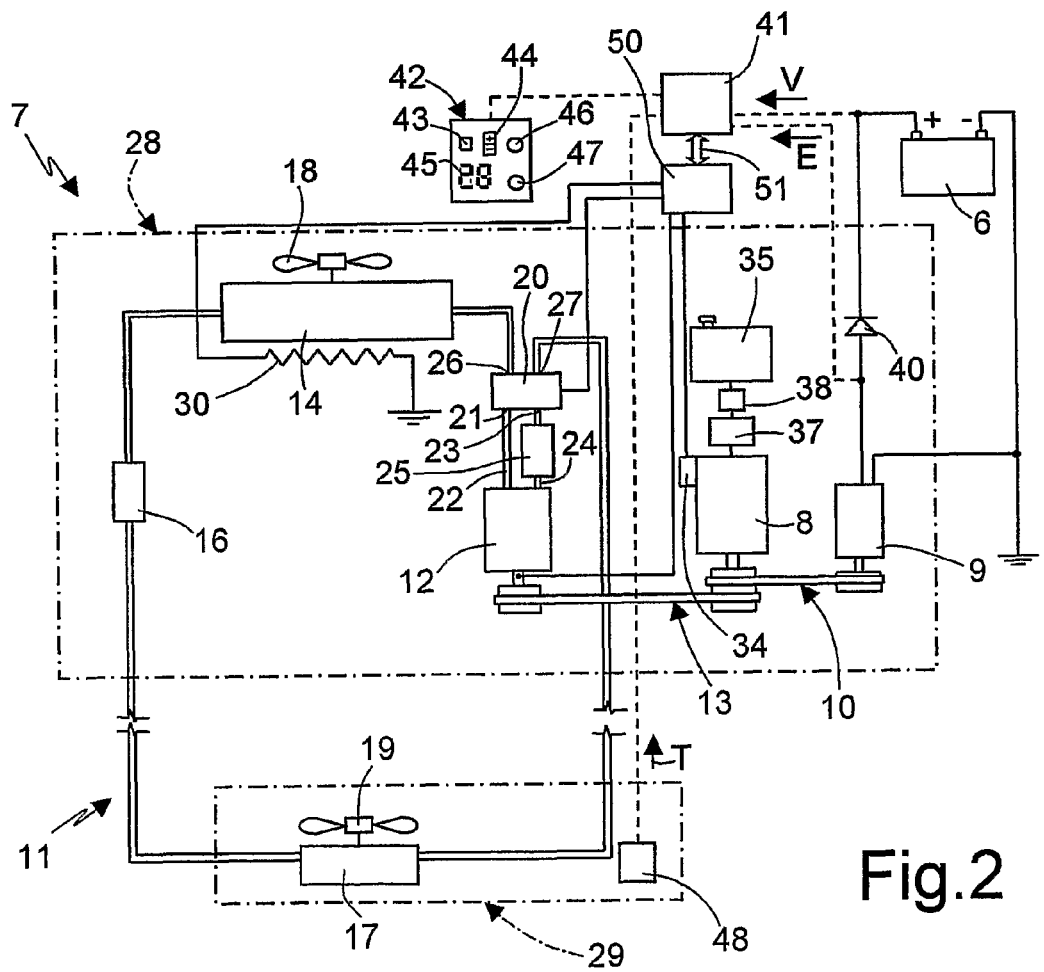
FIG. 2 shows a schematic of a preferred embodiment of the FIG. 1 auxiliary system.

Truck 1—which is only described as strictly necessary for a clear understanding of the present invention—comprises a main engine 5 supported on frame 2 and located beneath cab 3; a battery 6 (FIG. 2); a main air conditioning system (not shown) of cab 3; and an auxiliary power system 7, which has the dual function of air conditioning cab 3 and charging battery 6.

Auxiliary system 7 (FIG. 2) substantially comprises an auxiliary, preferably diesel, engine 8; an auxiliary alternator 9 driven by auxiliary engine 8 via a first belt drive 10; and a known cooling circuit 11.

Cooling circuit 11 comprises a compressor 12, driven by auxiliary engine 8 via a second belt drive 13, a condenser 14, an expansion valve 16, and an evaporator 17, which are cascade-connected to form a closed circuit in which cooling fluid flows. Condenser 14 and evaporator 17 have respective electric fans 18, 19.

Cooling circuit 11 is conveniently reversible, i.e. can operate as a cooling circuit or heat pump, as explained in detail later on.

Accordingly, cooling circuit 11 also comprises a cycle switch or inversion valve 20 interposed between compressor 12, condenser 14, and evaporator 17. More specifically, valve 20 has an inlet 21 connected to a delivery conduit 22 of compressor 12; an outlet 23 connected to an intake conduit 24 of compressor 12, conveniently via a dehydration filter 25; and an inlet 26 and outlet 27 connected to condenser 14 and evaporator 17 respectively.

System 1 is divided into an external unit 28 located outside cab 3, e.g. supported on frame 2; and an internal unit 29 housed inside cab 3, preferably in bunk compartment 4.

The internal unit comprises evaporator 17 and relative electric fan 19, and the external unit contains all the other components of cooling circuit 11, auxiliary engine 8, and auxiliary alternator 9. External unit 28 preferably also comprises a resistor 30 associated with condenser 14, and which is powered when cooling circuit 11 operates in reverse cycle mode, i.e. as a heat pump, in which case, condenser 14 actually operates as an evaporator and may reach very low temperatures with the formation of ice.

Auxiliary engine 8 has a starter 34; preferably a fuel tank 35 independent of the main tank 36 (FIG. 1) of truck 1; and a fuel pump 37 for feeding the injectors (not shown). An on-off fuel valve 38 is conveniently located along a low-pressure line between fuel tank 35 and the intake side of pump 37.

Auxiliary alternator 9 has a positive pole connected to the positive pole of battery 6, preferably via a decoupling diode 40 for decoupling auxiliary alternator 9 from the main alternator (not shown).

Auxiliary system 7 is controlled by a programmable control unit 41 associated with a data entry device 42, which may be, for example, a remote control or a control panel located in cab 3 and integrated in internal unit 29.

Device 42 conveniently comprises an operating mode (AIR CONDITIONING, BATTERY CHARGE, OFF) selection button 43; reference temperature setting buttons 44 for controlling the temperature of cab 3 when the AIR CONDITIONING function is activated; a temperature setting display 45; and respective light indicators 46, 47 indicating activation of the AIR CONDITIONING and BATTERY CHARGE functions.

Control unit 41 is also connected to a temperature sensor 48 located in the bunk compartment 4 of cab 3, preferably integrated in internal unit 29, and which supplies the control unit with an input signal T related to the temperature in the bunk compartment. Control unit 41 is also connected to battery 6, preferably via a precision resistive divider (not shown) from which it receives a signal V related to the battery voltage but appropriately lower in level, and is connected to the positive pole of auxiliary alternator 9, the voltage of which is determined and constitutes a signal E indicating auxiliary engine 8 is turned on.

By means of a power board 50, to which it is connected by a data bus 51, control unit 41 controls starter 34 of auxiliary engine 8, on-off fuel valve 38, and cooling circuit 11, as a function of the parameters set by device 42.

Auxiliary system 7 operates as follows.

System 7 can be set to AIR CONDITIONING or BATTERY CHARGE mode by means of button 43.

In AIR CONDITIONING mode, auxiliary engine 8 is started to drive compressor 12 and auxiliary alternator 9. The temperature in bunk compartment 4 is closed-loop controlled on the basis of the reference temperature value set by buttons 44, and the temperature value detected by sensor 48; and, depending on the sign of the difference between the above values, control unit 41 sets valve 20 to the position corresponding to cooling cycle mode to cool cab 3 (delivery conduit 22 of compressor 12 connected to condenser 14), or to the position corresponding to heat pump mode to heat cab 3 (delivery conduit 22 of compressor 12 connected to evaporator 17). Control of cooling circuit 11 is conventional and therefore not described in detail.

Since auxiliary engine 8 also drives auxiliary alternator 9 in AIR CONDITIONING mode, battery 6 is constantly charged.

According to the present invention, a function can also be set by which to charge the battery automatically even when cooling circuit 11 is disabled.

Figure 3:
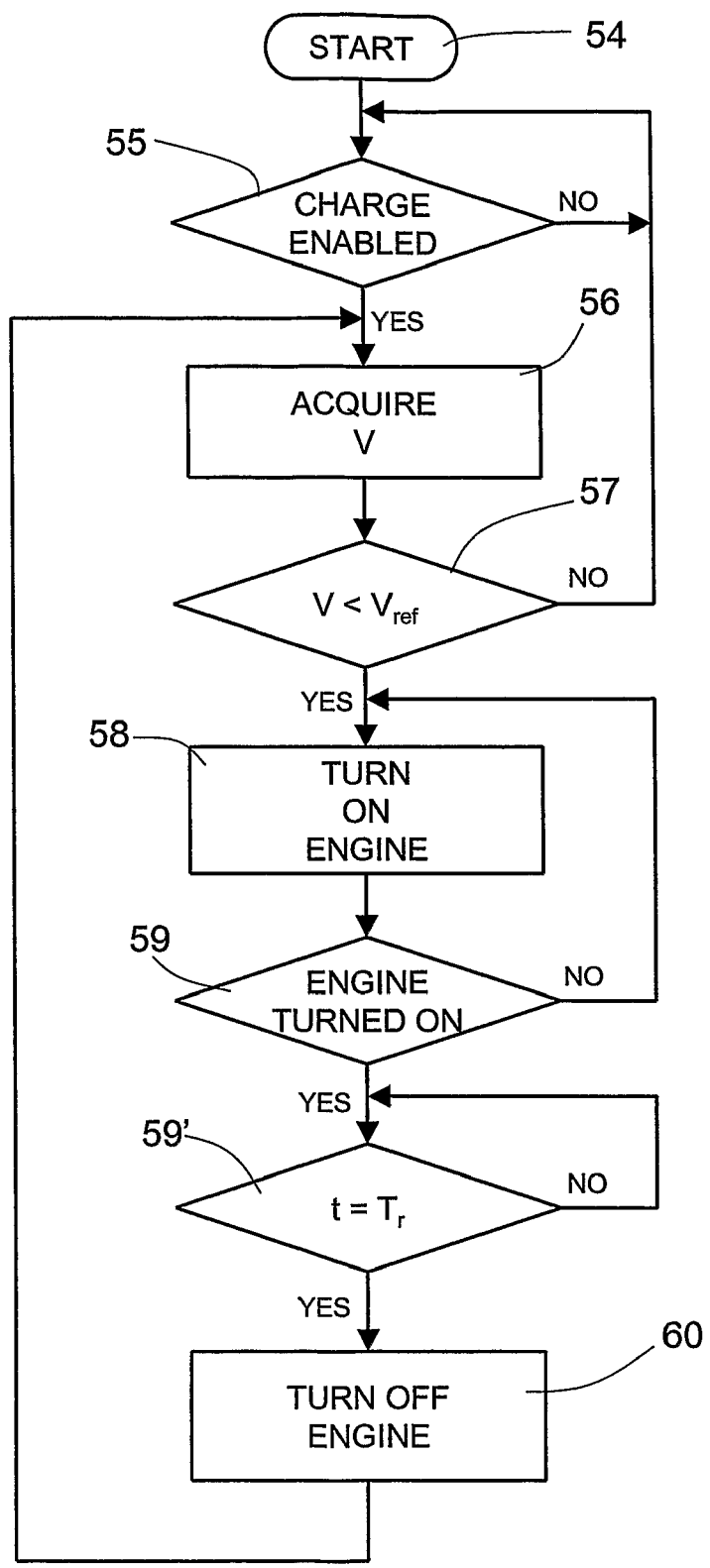
FIG. 3 shows a block diagram of a battery charge method in accordance with the present invention and using the FIG. 1 auxiliary system.

When AUTOMATIC CHARGE mode is set by means of button 43, control unit 41 operates according to the program described below with reference to the FIG. 3 flow chart.

Following a start block 54, a block 55 determines whether or not the automatic charge function is enabled. If it is, block 55 goes on to a block 56, which acquires signal V (voltage of battery 6). The next block 57 compares signal V with a reference value $V_{rif}$: if V is less than $V_{rif}$, block 57 goes on to a block 58, which starts auxiliary engine 8 by energizing starter 34; conversely, if V is greater than $V_{rif}$, block 57 goes back to the start of the cycle.

Block 58 goes on to a block 59, which determines whether the auxiliary engine is started, by acquiring signal E. If it is not started, block 59 goes back to block 58; if it is started, block 59 goes on to a hold block 59', which allows a given charge time $T_r$, e.g. 30', to elapse, after which, block 59' goes on to the next block 60, which turns the engine off by switching on-off fuel valve 38.

Block 60 then goes back to block 56 to acquire a further battery voltage, after which, the program proceeds as described, and may perform one or more charge cycles, depending on the outcome of the comparison in block 57.

In short, the voltage of battery 6 is determined and compared with a reference value; if less than the reference value, auxiliary engine 8 is started to drive auxiliary alternator 9, and a first charge cycle of given duration is performed. At the end of the cycle, auxiliary engine 8 is turned off and the battery charge checked. The engine must be turned off to ensure signal V represents the actual charge voltage of battery 6, and not the voltage of auxiliary alternator 9.

If necessary, the charge cycle is repeated and the heat engine started again. Otherwise, charging is completed.

Clearly, changes may be made to auxiliary system 7 according to the present invention without, however, departing from the scope as defined in the accompanying Claims.

In particular, cooling circuit 11 may be dispensed with, and system 7 may be limited to battery charge function components.

Auxiliary alternator 9 and compressor 12 may be driven by a single belt.

Cooling circuit 11 may have no cycle inversion valve 20, and may be used solely to cool the cab.

Finally, starter 34 and auxiliary alternator 9 may be replaced by a single reversible electric machine.

Internal unit 29 may be located anywhere inside a vehicle, e.g. may be used to cool a refrigeration compartment. Two or more units 29 may be provided for different environments or for different portions of the same environment, e.g. different parts of the cab, to ensure a more even temperature.

Auxiliary tank 35 may be eliminated, and auxiliary engine 8 fuelled directly from main tank 36.

The system may also be used for vehicles other than trucks, e.g. cars or campers.

The invention claimed is:

1. An auxiliary power system for a vehicle having a main engine and a main air conditioning system, comprising an auxiliary internal combustion engine having a starter; an auxiliary current generator driven by said auxiliary engine and connectable to a battery of the vehicle; an auxiliary cooling circuit having a compressor driven by said auxiliary engine; control means comprising comparing means connected to said battery to determine the voltage of the battery; further control means for activating said starter of said auxiliary engine said control means generating an enabling signal to activate said starter of said auxiliary engine in response to a voltage value of said battery below a reference value; further control means for measuring time from the start of the auxiliary engine; further control means for turning off said auxiliary engine; said control means generating a control signal, for said means for turning off said auxiliary engine, when the measured time reaches a predetermined charge time; said control means providing for an automatic recharge of said battery even when said main engine is turned off.

2. A system as claimed in claim 1, characterized in that said cooling circuit is reversible.

3. A system as claimed claim 1, characterized by being divided into a first unit installable in an interior compartment of said vehicle and comprising aid evaporator and a relative electric fan; and into a second unit installable outside said compartment and comprising the rest of the components of said cooling circuit, said auxiliary engine, and said auxiliary alternator.

4. A vehicle comprising a main engine; a main air conditioning system; a battery; and an auxiliary power system, in turn comprising an auxiliary internal combustion engine with a starter, a current generator driven by said auxiliary engine and connectable to the battery of the vehicle; an auxiliary cooling circuit having a compressor driven by said auxiliary engine; control means for controlling the auxiliary power system comprising comparing means connected to said battery to determine the voltage of the battery; and further control means for activating said starter of said auxiliary engine in response to a voltage value of said battery below a reference value; further control means for measuring time from the start of the auxiliary engine; further control means for turning off said auxiliary engine; said control means generating a control signal, for said means for turning off said auxiliary engine, when the measured time reaches a predetermined charge time; said control means providing for an automatic recharge of said battery even when said main engine is turned off.

5. A vehicle as claimed in claim 4, characterized in that said cooling circuit is reversible.

6. A method of charging a battery of a vehicle having a main engine, a battery, and an auxiliary power system including an auxiliary internal combustion engine, characterized by comprising the steps of:
   a) acquiring the voltage of the battery;
   b) comparing the acquired voltage value with a reference value;
   c) commencing a charge cycle to charge the battery by automatically starting the auxiliary internal combustion engine in the event the acquired voltage value is below the reference value even when the main engine is turned off;
   d) measuring time from the start of the auxiliary internal combustion engine,
   e) turning the auxiliary engine off when the measured time reaches a predetermined charge time.

7. A method as claimed claim 6, characterized by cyclically repeating the steps from a) to e).

* * * * *